(12) United States Patent
Yamamoto et al.

(10) Patent No.: US 12,051,451 B2
(45) Date of Patent: Jul. 30, 2024

(54) MAGNETIC DISK DEVICE AND METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yu Yamamoto, Meguro Tokyo (JP); Takao Abe, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 18/178,128

(22) Filed: Mar. 3, 2023

(65) Prior Publication Data

US 2024/0096359 A1    Mar. 21, 2024

(30) Foreign Application Priority Data

Sep. 21, 2022  (JP) ................. 2022-150516

(51) Int. Cl.
*G11B 5/596* (2006.01)
*G11B 20/18* (2006.01)

(52) U.S. Cl.
CPC ................ *G11B 5/59688* (2013.01)

(58) Field of Classification Search
CPC ....... G11B 5/966; G11B 5/59666; G11B 5/54; G11B 5/59688; G11B 2220/2516; G11B 20/18; G11B 5/59627

USPC ...................................... 360/77.04
See application file for complete search history.

(56) References Cited

U.S. PATENT DOCUMENTS

| 6,924,959 B1* | 8/2005 | Melkote ............ G11B 5/59627 |
| | | 360/77.04 |
| 7,593,180 B2 | 9/2009 | Yun et al. |
| 9,236,073 B1 | 1/2016 | Liu et al. |
| 2009/0290253 A1 | 11/2009 | Tomita |

FOREIGN PATENT DOCUMENTS

JP           4940416 B2    5/2012

* cited by examiner

*Primary Examiner* — Nabil Z Hindi
(74) *Attorney, Agent, or Firm* — Knobbe, Martens, Olson & Bear, LLP

(57) ABSTRACT

According to embodiments, a magnetic disk device includes a magnetic disk, a magnetic head, and a controller. In the magnetic disk, a plurality of servo sectors is arranged in a circumferential direction. Servo information including a post code indicating a repeatable runout (RRO) correction amount is written to each of the plurality of servo sectors. The magnetic head writes and reads data to and from the magnetic disk. In positioning control for the magnetic head, when a read error of a first post code continuously occurs, the controller uses a first RRO correction value, which is different from a second RRO correction value based on the RRO correction value indicated by the first post code. The first post code is a post code of a first servo sector, which is one of the plurality of servo sectors.

18 Claims, 10 Drawing Sheets

MAGNETIC DISK DEVICE AND METHOD

CROSS-REFERENCE TO RELATED APPLICATIONS

This application is based upon and claims the benefit of priority from Japanese Patent Application No. 2022-150516, filed on Sep. 21, 2022; the entire contents of which are incorporated herein by reference.

FIELD

Embodiments described herein relate generally to a magnetic disk device and a method.

BACKGROUND

In a magnetic disk device, at the time of write to a magnetic disk, a write permitted range is set in a radial direction centered on a track. When the position of a magnetic head is within the write permitted range, write is executed. When the position of the magnetic head deviates from the write permitted range, it is determined again whether or not the position of the magnetic head is within the write permitted range at the time when the magnetic disk makes one rotation and the magnetic head approaches the circumferential position of a write target again. When the position of the magnetic head deviates from the write permitted range, time required to complete the write increases, and performance degrades.

DETAILED DESCRIPTION

According to the present embodiments, a magnetic disk device includes a magnetic disk, a magnetic head, and a controller. In the magnetic disk, a plurality of servo sectors is arranged in a circumferential direction. Servo information including a post code indicating a repeatable runout (RRO) correction amount is written to each of the plurality of servo sectors. The magnetic head writes and reads data to and from the magnetic disk. In positioning control for the magnetic head, when a read error of a first post code continuously occurs, the controller uses a first RRO correction value, which is different from a second RRO correction value based on the RRO correction value indicated by the first post code. The first post code is a post code of a first servo sector, which is one of the plurality of servo sectors.

The magnetic disk device and a method according to the embodiments will be described in detail below with reference to the accompanying drawings. These embodiments do not limit the present invention.

First Embodiment

Figure 1:
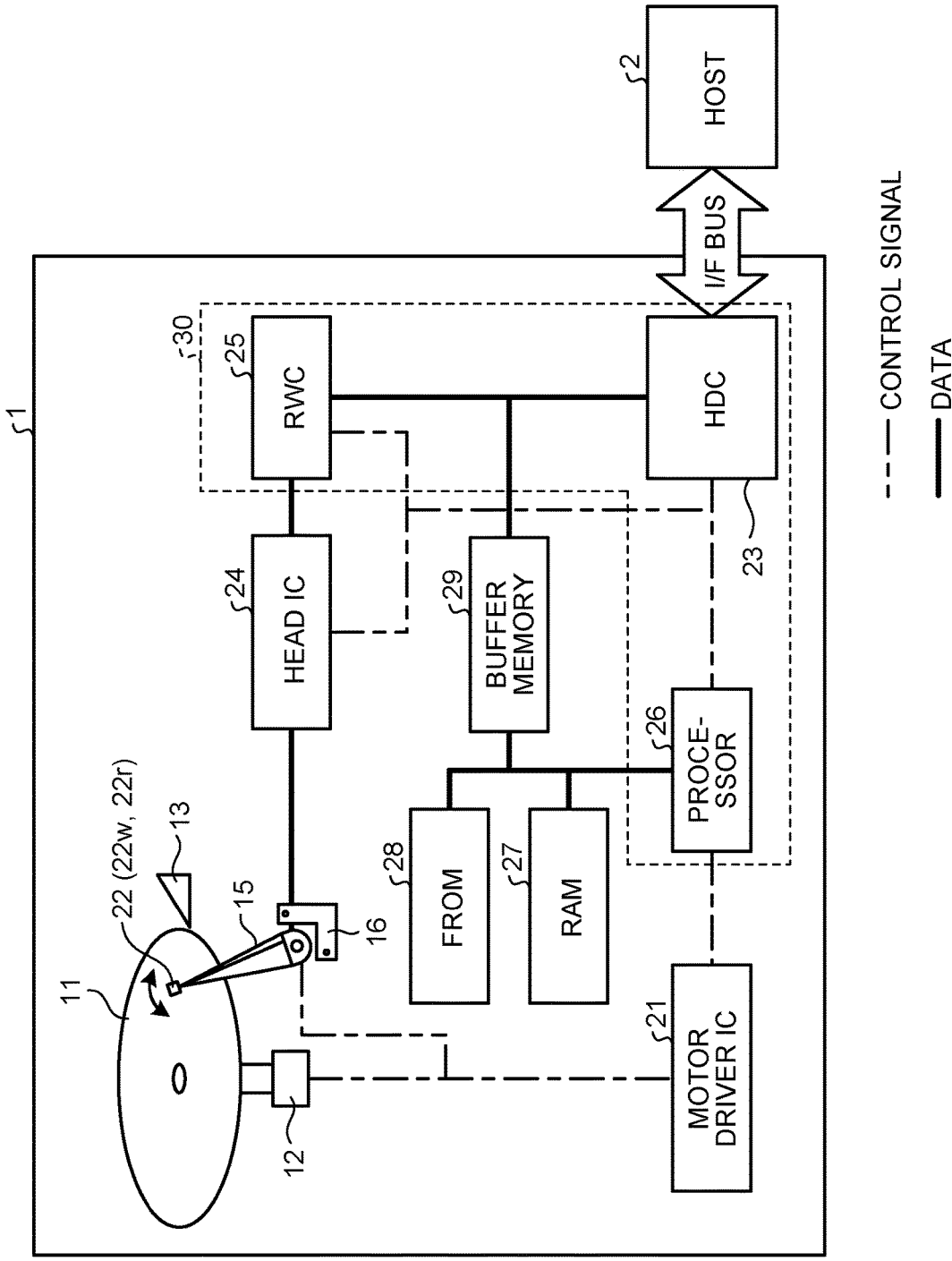
FIG. 1 is a schematic diagram illustrating one example of a configuration of a magnetic disk device according to a first embodiment.

FIG. 1 is a schematic diagram illustrating one example of a configuration of a magnetic disk device 1 according to a first embodiment.

The magnetic disk device 1 is connected to a host 2. The magnetic disk device 1 can receive an access command such as a write command and a read command from the host 2.

The magnetic disk device 1 includes a magnetic disk 11 on a surface of which a recording surface is formed. The magnetic disk device 1 writes and reads data to and from the magnetic disk 11 (more accurately, recording surface of magnetic disk 11) in accordance with the access command. Although the magnetic disk device 1 may include a plurality of magnetic disks 11, the magnetic disk device 1 includes one magnetic disk 11 in the embodiment for simplicity of description and illustration.

Data is written and read via a magnetic head 22. Specifically, in addition to the magnetic disk 11, the magnetic disk device 1 includes a spindle motor 12, a motor driver integrated circuit (IC) 21, the magnetic head 22, an actuator arm 15, a voice coil motor (VCM) 16, a ramp 13, a head IC 24, a read/write channel (RWC) 25, a RAM 27, a flash read only memory (FROM) 28, a buffer memory 29, a hard disk controller (HDC) 23, and a processor 26.

The spindle motor 12 attached to a rotation shaft of the magnetic disk 11 rotates the magnetic disk 11 at a predetermined rotation speed. The motor driver IC 21 drives the spindle motor 12.

The motor driver IC 21 controls rotation of the spindle motor 12 and rotation of the VCM 16.

The magnetic head 22 includes a write element 22$w$ and a read element 22$r$. The magnetic head 22 writes and reads data to and from the magnetic disk 11 with the write element 22$w$ and the read element 22$r$. The magnetic head 22 is attached to a distal end of the actuator arm 15. The magnetic head 22 is moved along a radial direction of the magnetic disk 11 by the VCM 16 driven by the motor driver IC 21.

For example, when the rotation of the magnetic disk 11 has stopped, the magnetic head 22 is moved onto the ramp 13. The ramp 13 holds the magnetic head 22 at a position spaced separated from the magnetic disk 11.

The head IC 24 amplifies and outputs a signal read by the magnetic head 22 from the magnetic disk 11, and supplies the signal to the RWC 25 during reading. The head IC 24 amplifies a signal corresponding to data to be written supplied from the RWC 25, and supplies the signal to the magnetic head 22.

The HDC 23 performs control of transmission and reception of data to and from the host 2 via an I/F bus, control of the buffer memory 29, error correction processing for read data, and the like.

The buffer memory 29 is used as a buffer for data transmitted to and received from the host 2. For example, the buffer memory 29 is used for temporarily storing data written to the magnetic disk 11 or data read from the magnetic disk 11.

The buffer memory 29 includes, for example, a volatile memory capable of high-speed operation. A memory constituting the buffer memory 29 is not limited to a specific type. For example, the buffer memory 29 may include a dynamic random access memory (DRAM), a static random access memory (SRAM), or a combination thereof.

The RWC 25 modulates data to be written supplied from the HDC 23, and supplies the data to the head IC 24. The RWC 25 demodulates a signal read from the magnetic disk 11 and supplied from the head IC 24, and outputs the signal to the HDC 23 as digital data.

The processor 26 is, for example, a central processing unit (CPU). The RAM 27, the flash read only memory (FROM) 28, and the buffer memory 29 are connected to the processor 26.

The FROM 28 is a nonvolatile memory. The FROM 28 stores firmware (program data), various operation parameters, and the like. The magnetic disk 11 may store the firmware.

The RAM 27 includes, for example, a DRAM, an SRAM, or a combination thereof. The RAM 27 is used as an operation memory by the processor 26. The RAM 27 is used as a region for loading firmware and a region for holding various pieces of management data.

The processor 26 entirely controls the magnetic disk device 1 in accordance with firmware stored in the FROM 28 and the magnetic disk 11. For example, the processor 26 loads the firmware from the FROM 28 or the magnetic disk 11 to the RAM 27, and controls the motor driver IC 21, the head IC 24, the RWC 25, the HDC 23, and the like in accordance with the loaded firmware.

A configuration including the RWC 25, the processor 26, and the HDC 23 can be regarded as a controller 30. In addition to these components, the controller 30 may include other elements (e.g., RAM 27, FROM 28, buffer memory 29, or RWC 25).

Figure 2:
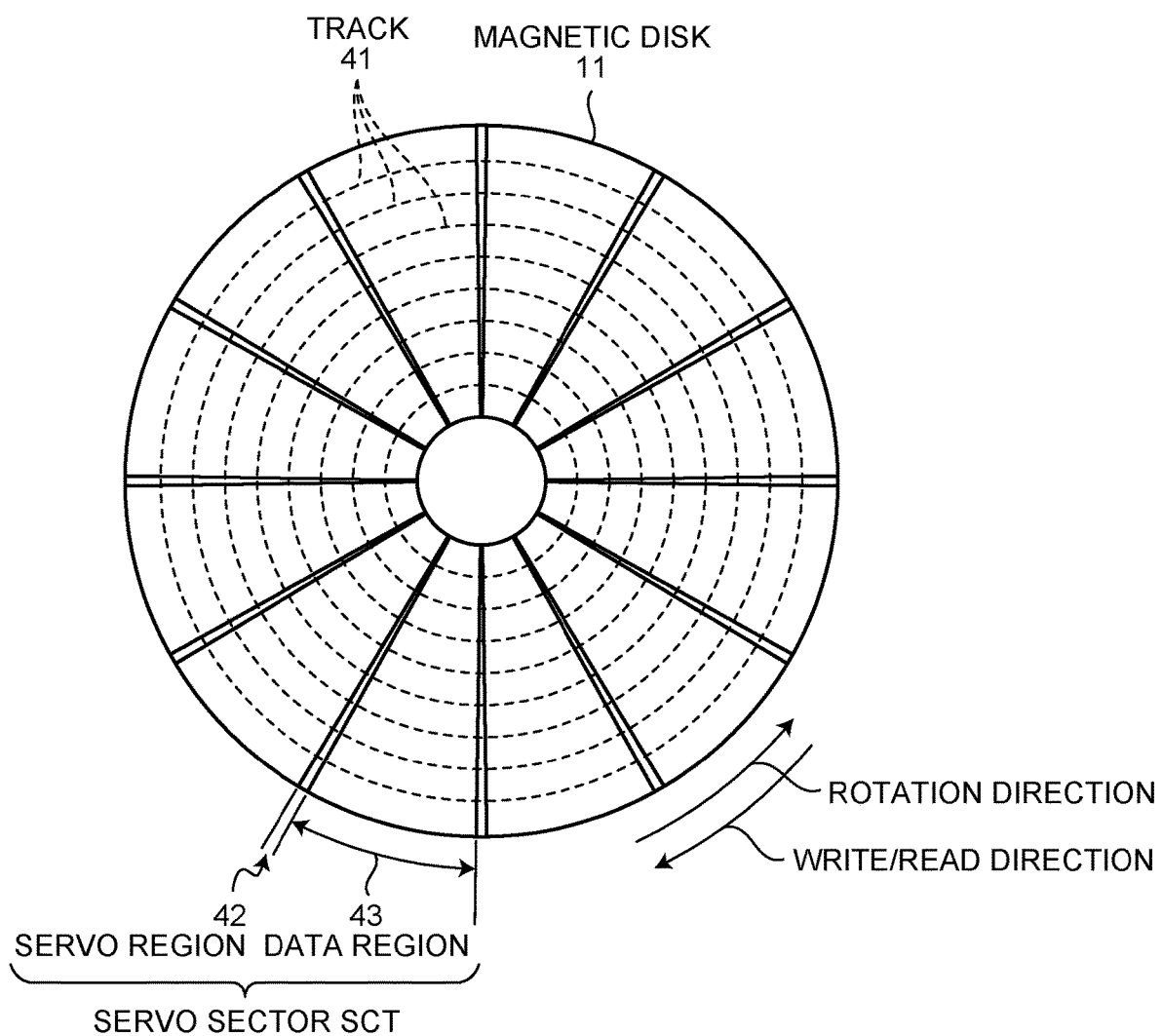
FIG. 2 is a schematic diagram illustrating one example of a configuration of a magnetic disk according to the first embodiment.

FIG. 2 is a schematic diagram illustrating one example of a configuration of the magnetic disk 11 according to the first embodiment. The figure illustrates one example of a rotation direction of the magnetic disk 11. The magnetic head 22 moves relative to the magnetic disk 11 by the rotation of the magnetic disk 11. A write/read direction, that is, a direction in which data is written or read by the magnetic head 22 along the circumferential direction is opposite to the rotation direction of the magnetic disk 11.

In a manufacturing process, servo information SV is written to the magnetic disk 11 by, for example, a servo writer or self-servo write (SSW). FIG. 2 illustrates radially arranged servo regions 42 in one example of the arrangement of the servo regions in which the servo information SV is written.

A data region 43 in which data can be written is provided between servo regions 42. One servo region 42 and one data region 43 adjacent to the servo region 42 constitute a servo sector SCT. That is, a plurality of servo sectors SCT is circumferentially arranged in the magnetic disk 11.

A plurality of concentric tracks 41 is set in a radial direction of the magnetic disk 11 based on the servo information SV. In the data region 43, a large number of data sectors to which data is written are continuously arranged along the track 41.

Expressions associated with the positional relation in the circumferential direction used in the present specification will be defined. When a first region and a second region near the first region are provided along the write/read direction and the magnetic head 22 passes through the first region before the second region, a direction from the second region toward the first region is defined as "front". A direction from the first region toward the second region is defined as "back". When the first region and the second region are adjacent to each other, the first region viewed from the second region may be referred to as a region "immediately before" the second region. When the first region and the second region are adjacent to each other, the second region viewed from the first region may be referred to as a region "immediately after" the first region.

Figure 3:
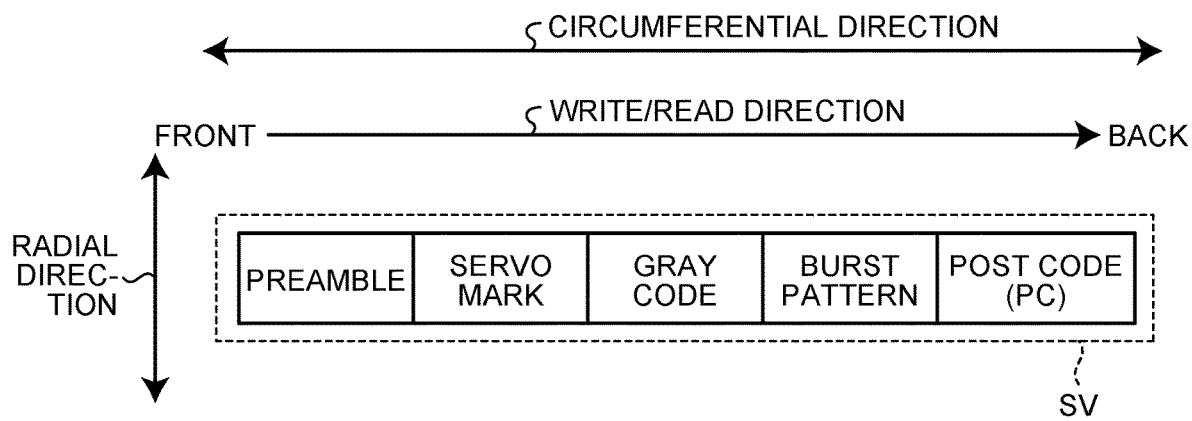
FIG. 3 illustrates one example of a configuration of servo information according to the first embodiment.

FIG. 3 illustrates one example of a configuration of the servo information SV according to the first embodiment. In this example, in the servo region 42, a preamble, a servo mark, a Gray code, a burst pattern, and a post code are written in this order in the write/read direction. In the present specification, the post code may be abbreviated as PC.

The preamble is a signal for synchronizing a servo pattern with a reproduction signal. The servo mark indicates the start of servo data. The Gray code indicates a sector address and a cylinder address. The sector address is an ID for identifying each servo sector SCT on the track 41. The cylinder address is an ID for identifying each track 41 provided on the magnetic disk 11. The burst pattern is data used to detect an amount of positional deviation of the magnetic head 22 in the radial direction from the center of the track 41 (hereinafter, abbreviated as track center), and includes a repetitive pattern of a predetermined cycle. For example, the cylinder address is given as, for example, an integer value. An offset amount after the decimal point based on a position indicated by the cylinder address can be obtained by demodulating the burst pattern.

The tracks 41 ideally has a shape of a perfect circle. However, a servo track is distorted by, for example, vibration received at the time when the servo information SV is written. A position in the radial direction (radial position) of a track set based on the burst pattern (more accurately, combination of Gray code and burst pattern) may thus deviate from the radial position of the tracks 41 having the ideal shape. This positional deviation occurs repeatedly in the same manner with one rotation of the magnetic disk (and spindle motor) as a cycle, and is thus called repeatable runout (RRO). The post code is obtained by coding a correction amount for correcting the RRO.

Correcting the RRO is referred to as RRO correction. A correction amount indicated by the post code is referred to as an RRO correction value.

A signal read by the magnetic head 22 (more accurately, read element 22$r$) includes the servo information SV and data read from the data sector. The servo information SV read by the magnetic head 22 is demodulated into a positional error signal (PES) indicating a relative position of the magnetic head 22 from the track by the head IC 24, and supplied to the controller 30. The controller 30 executes positioning control for the magnetic head 22 based on the supplied positional error signal in cooperation with the motor driver IC 21.

For example, the controller 30 and the motor driver IC 21 execute feedback control to bring the difference between the position of an aimed track and the current position of the magnetic head 22 close to zero based on the positional error signal.

Movement operations of the magnetic head 22 mainly include a seeking operation and a track following operation. In the seeking operation, the magnetic head 22 is moved to the aimed track in the radial direction of the magnetic disk 11. In the track following operation, the position of the magnetic head 22 is maintained on the aimed track after the magnetic head 22 is moved to the vicinity of the aimed track by the seeking operation. In the track following operation, the position of the magnetic head 22 is adjusted by the above-described feedback control so that the magnetic head 22 relatively moves along the aimed track. A state in which the position of the magnetic head 22 is maintained on the aimed track is referred to as an on-track state.

Data is written and read at the time when the magnetic head 22 is in the on-track state. That is, the controller 30 determines whether or not the magnetic head 22 is in the on-track state. When the magnetic head 22 is in the on-track state, the controller 30 writes and reads data by using the magnetic head 22.

Whether or not the magnetic head 22 is in the on-track state is determined based on a threshold set based on the position of the track. For example, a threshold used to determine the on-track state during write operation is referred to as a write offtrack slice (WOS).

Figure 4:
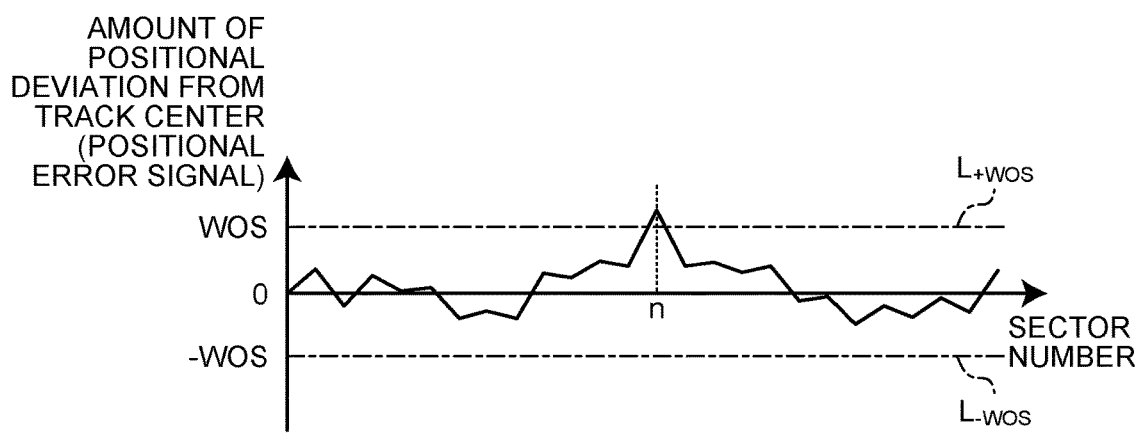
FIG. 4 is a graph illustrating one example of a track of a magnetic head at the time of write of the magnetic disk device according to the first embodiment.

FIG. 4 is a graph illustrating one example of a track of the magnetic head 22 at the time of write of the magnetic disk device 1 according to the first embodiment. The horizontal axis indicates a position along a certain track 41. Here, in one example, the position along the track 41 is indicated by the number of a sector SCT, that is, the sector number. The vertical axis indicates an amount of positional deviation from the track center. The amount of positional deviation from the track center is an amount of positional deviation in the radial direction from the ideal shape of the tracks 41, and is a positional error signal obtained by using the Gray code, the burst pattern, and the post code.

When a position in the radial direction is mentioned, a direction toward the inner periphery of the magnetic disk 11 is referred to as a positive direction, and a direction toward the outer periphery of the magnetic disk 11 is referred to as a negative direction. In relation to the position in the radial direction, a designer can optionally determine which of the direction toward the inner periphery of the magnetic disk 11 and the direction toward the outer periphery of the magnetic disk 11 is referred to as the positive direction.

When data is written to the tracks 41, the position of the magnetic head 22 is adjusted by the track following operation so that the difference between the position of the magnetic head 22 and the track center approaches zero. The position of the magnetic head 22, however, can vary from an aimed position due to various disturbances. As a result, as illustrated in FIG. 4, the track of the magnetic head 22 varies from the track center.

A write permitted range of the magnetic head 22 at the time when data is written is preliminarily set for each track 41. A line radially separated from the track center by a WOS defines a boundary of the write permitted range. According to FIG. 4, a positive-side line $L_{+WOS}$ is set at a position separated from the track center by the WOS on the positive side, and a negative-side line $L_{-WOS}$ is set at a position separated from the track center by the WOS on the negative side.

While data is written to the track 41, the servo information SV is read each time the magnetic head 22 passes through a servo region 42, and the positional error signal generated from the read servo information SV is supplied to the controller 30. Each time the positional error signal is acquired, the controller 30 estimates whether or not the magnetic head 22 is within the write permitted range based on the acquired positional error signal.

Specifically, the controller 30 compares the distance of the position of the magnetic head 22 from the track center with the WOS based on the positional error signal. When the distance of the position of the magnetic head 22 from the track center exceeds the WOS, the controller 30 estimates that the position of the magnetic head 22 deviates from the write permitted range. When the distance of the position of the magnetic head 22 from the track center does not satisfy the WOS, the controller 30 estimates that the position of the magnetic head 22 is within the write permitted range. When the distance of the position of the magnetic head 22 from the track center is equal to the WOS, any piece of processing is performed. The controller 30 may estimate that the position of the magnetic head 22 is within the write permitted range, or may estimate that the position of the magnetic head 22 deviates from the write permitted range.

When the position of the magnetic head 22 is estimated to deviate from the write permitted range, the magnetic head 22 is not in the on-track state. The controller 30 thus stops write to the track 41.

When the magnetic disk 11 makes one more rotation and the magnetic head 22 approaches a write stop position again after write to the track 41 is stopped, the controller 30 estimates whether or not the magnetic head 22 is within the write permitted range again. When the magnetic head 22 is estimated to be within the write permitted range, the controller 30 resumes processing related to write to the track 41. This processing is referred to as write retry.

In the example in FIG. 4, the position of the magnetic head 22 deviates from the write permitted range in the servo sector SCT having the sector number n. The controller 30 thus stops write in the servo sector SCT having the sector number n, and executes write retry on a data sector near the servo sector SCT having the sector number n.

The servo information SV is discretely written in the circumferential direction of the magnetic disk 11. The controller 30 intermittently acquires the positional error signal. Even if the position of the magnetic head 22 does not deviate from the write permitted range in determination based on the positional error signal acquired from a certain servo sector SCT, when the position of the magnetic head 22 radially varies at a certain speed, the position of the magnetic head 22 may deviate from the write permitted range at the time when the magnetic head 22 reaches the immediately following servo sector SCT or before the magnetic head 22 reaches the immediately following servo sector SCT.

The controller 30 may use an amount obtained by adding a radial speed of the magnetic head 22 to the position of the magnetic head 22 for comparison with the WOS. Specifically, in determination in a certain servo sector SCT (referred to as first servo sector SCT), a difference between a positional error signal acquired from the first servo sector SCT and a positional error signal acquired from a second servo sector SCT immediately before the first servo sector SCT is added to the positional error signal acquired from the first servo sector SCT to acquire a position evaluation amount to which the radial speed of the magnetic head 22 is added in the first servo sector SCT. The controller 30 may compare the position evaluation amount with the WOS instead of or in addition to the comparison between the positional error signal and the WOS. A value of the WOS compared with the positional error signal may be equal to or different from a value of the WOS compared with the position evaluation amount.

The deviation of the position of the magnetic head 22 from the write permitted range will be hereinafter referred to as off-track.

The servo information SV, particularly the post code here, may cause quality deterioration due to various causes after shipment of the magnetic disk device 1. In such a case, the post code with deteriorated quality cannot be correctly read, and appropriate correction of positional deviation caused by RRO is difficult, which may cause frequent occurrence of off-track. Frequent occurrence of off-track causes write retry to be executed for each off-track, which degrades performance (specifically, write performance).

In the first embodiment, when a read error of a post code or deterioration of positioning accuracy due to RRO correction occurs in a certain servo sector SCT, a RRO correction value used for the RRO correction in the servo sector SCT is changed. This inhibits the occurrence frequency of write retry, and improves the performance of the magnetic disk device 1.

In the first embodiment, the WOS is tightened in the servo sector SCT in which an RRO correction value to be used has been changed. This reduces a risk that the magnetic head 22 approaches an adjacent track at the time of write and overwrites data of the adjacent track with another piece of data.

Figure 5:
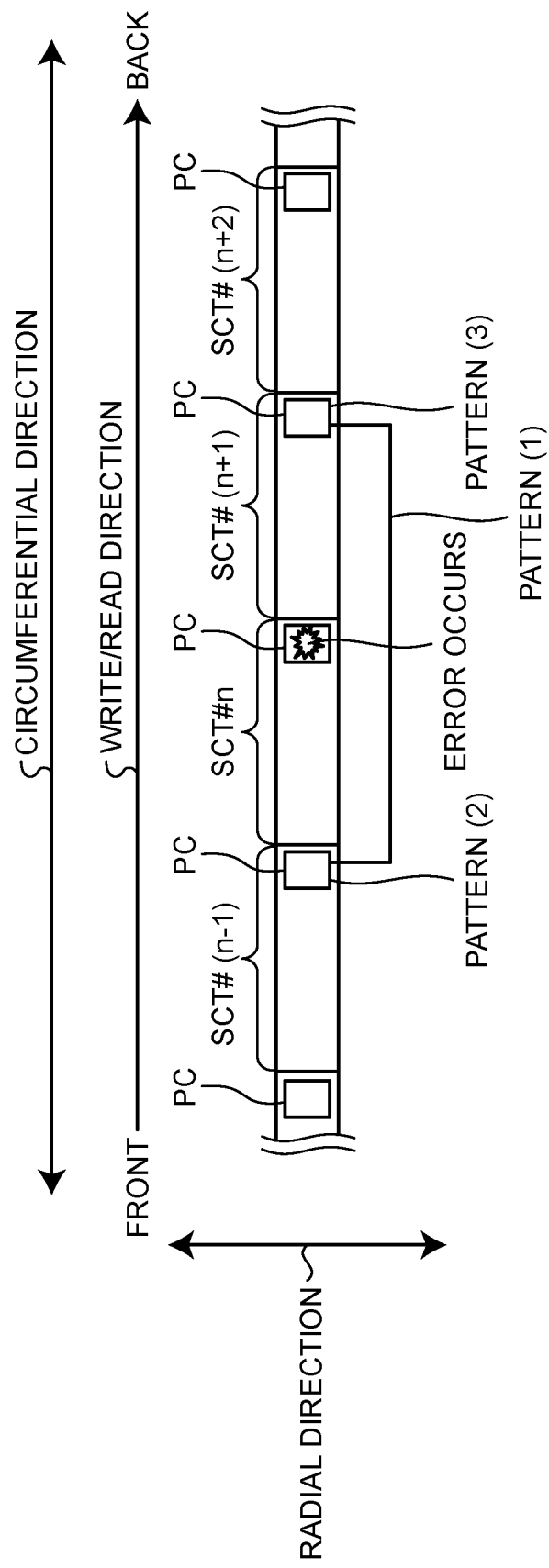
FIG. 5 illustrates one example of a method of changing an RRO correction value according to the first embodiment.

FIG. 5 illustrates one example of a method of changing an RRO correction value according to the first embodiment. The figure illustrates a servo sector SCT #(n−1), a servo sector SCT #n, a servo sector SCT #(n+1), and a servo sector SCT #(n+2) in one example of a plurality of servo sectors SCT continuously arranged along a certain track 41. A servo sector SCT to which x (where x is integer of 0 or more) is given as a sector address will be referred to as a servo sector SCT #x here.

A case where an error occurs in the servo sector SCT #n, in other words, a case where a read error of a post code occurs or where off-track occurs at the time when positioning is performed by using the servo information SV including a post code of the servo sector SCT #n will be described here. In the description of FIG. 5, the servo sector SCT #n in which an error has occurred may be referred to as a target servo sector.

When an error occurs in the servo sector SCT #n, the controller 30 can change a setting of an RRO correction value to be used by using a post code of the servo sector SCT #(n−1) adjacent before the servo sector SCT #n and a post code of the servo sector SCT #(n+1) adjacent after the servo sector SCT #n.

Specifically, the controller 30 performs RRO correction on a position indicated by a Gray code and a burst pattern read from the servo sector SCT #n by using an interpolation value between an RRO correction value indicated by the post code of the servo sector SCT #(n−1) and an RRO correction value indicated by the post code of the servo sector SCT #(n−1). A pattern using an interpolation value between an RRO correction value indicated by a post code of a servo sector SCT adjacent before a target servo sector and an RRO correction value indicated by a post code of a servo sector SCT adjacent after the target servo sector instead of such an RRO correction value of the target servo sector is referred to as a pattern (1). The interpolation value is a value between two RRO correction values obtained by average, interpolation, or any calculation.

The controller 30 can perform RRO correction on a position indicated by a Gray code and a burst pattern read from a target servo sector SCT by using an RRO correction value of a servo sector SCT (servo sector SCT #(n−1) in FIG. 5) adjacent before the target servo sector as an RRO correction value of the target servo sector. A pattern using an RRO correction value indicated by a post code of a servo sector SCT adjacent before a target servo sector instead of such an RRO correction value of the target servo sector is referred to as a pattern (2).

The controller 30 can perform RRO correction on a position indicated by a Gray code and a burst pattern read from a target servo sector SCT by using an RRO correction value of a servo sector SCT (servo sector SCT #(n+1) in FIG. 5) adjacent after the target servo sector as an RRO correction value of the target servo sector. A pattern using an RRO correction value indicated by a post code of a servo sector SCT adjacent after a target servo sector instead of such an RRO correction value of the target servo sector is referred to as a pattern (3).

Each time an error occurs in the same servo sector SCT, the controller 30 applies the patterns (1) to (3) in order to execute write retry. The order of application of the patterns (1) to (3) is not limited to a specific order. Here, in one example, the controller 30 applies the pattern (1), the pattern (2), and the pattern (3) in this order.

Figure 6:
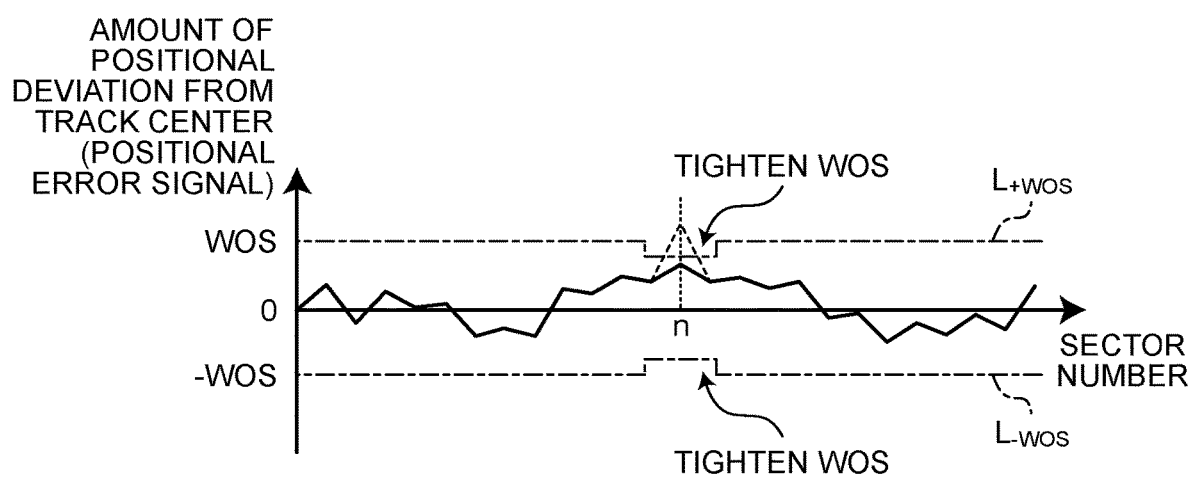
FIG. 6 illustrates one example of a method of tightening a WOS according to the first embodiment.

FIG. 6 illustrates one example of a method of tightening a WOS according to the first embodiment. In the example in the figure, the WOS is reduced on a positive side and a negative side around a servo sector SCT having the sector number n, in which an error has occurred. That is, tightening a WOS means reducing the WOS. The width of the write permitted range is reduced by tightening the WOS.

Operation of the magnetic disk device according to the first embodiment will be subsequently described.

Figure 7:
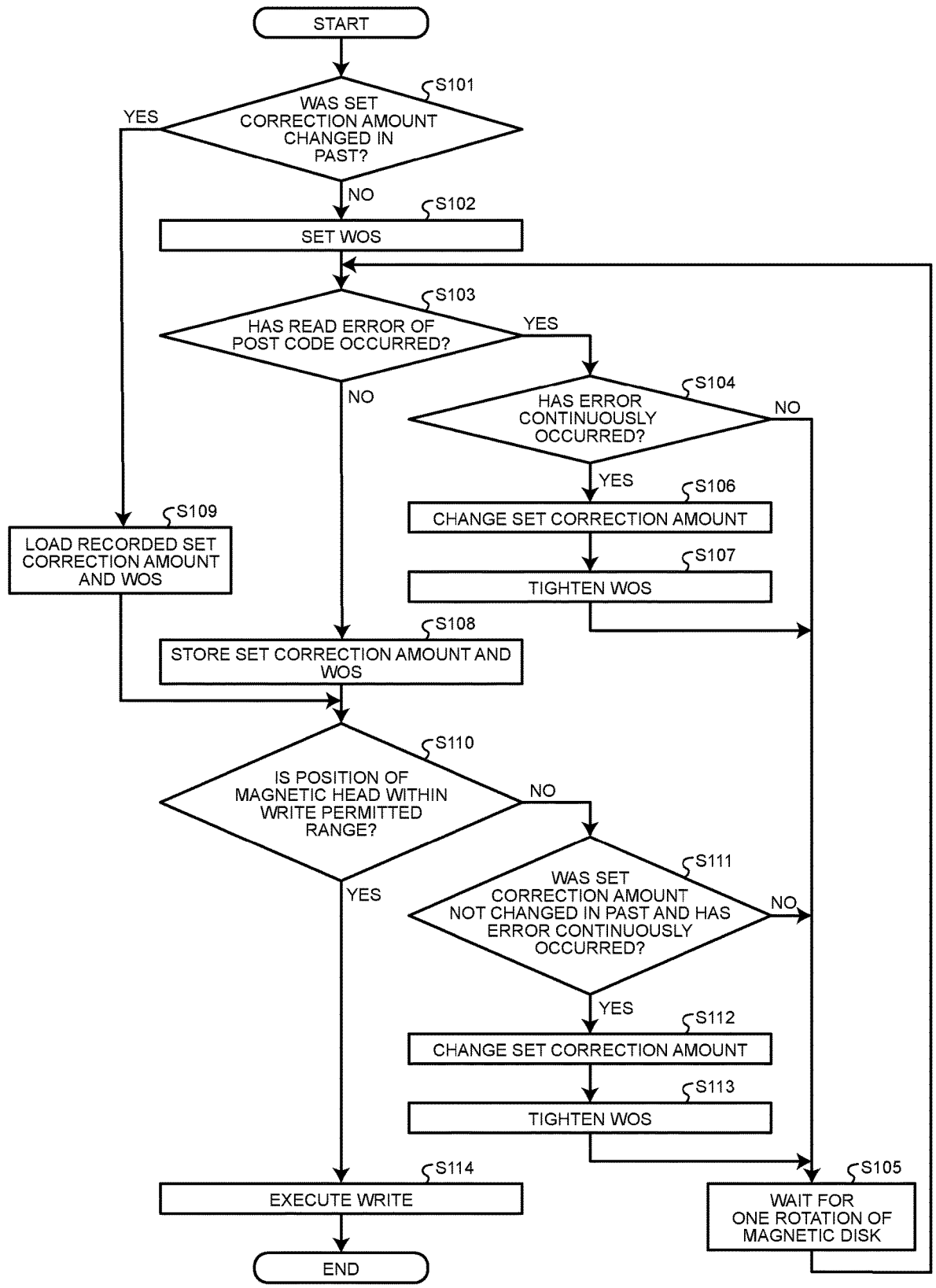
FIG. 7 is a flowchart illustrating one example of write operation according to the first embodiment.

FIG. 7 is a flowchart illustrating one example of write operation according to the first embodiment. Here, in one example, operation of writing data to a certain data sector will be described. In the description of the figure, a servo sector SCT including a servo region 42 located in front among two servo regions 42 sandwiching the data sector is referred to as a target servo sector. An RRO correction value set to be used is referred to as a set correction amount.

First, the controller 30 determines whether or not a set correction amount of a target servo sector was changed in the past (S101).

In an initial state, an RRO correction value indicated by a post code of the target servo sector is set as the set correction amount of the target servo sector. In S101, the controller 30 determines whether or not the set correction amount of the target servo sector is in the initial state. For example, the set correction amount is stored at a predetermined position (e.g., FROM 28) in the magnetic disk device 1. In such a case, the controller 30 can determine whether or not the set correction amount of the target servo sector was changed in the past by determining whether or not an initial value is stored in the FROM 28 as the set correction amount of the target servo sector. A method of determining whether or not the set correction amount of the target servo sector was changed in the past is not limited thereto. For example, the controller 30 may manage whether or not the set correction amount of each servo sector was changed in the past by using a flag. A position where the set correction amount is stored is not limited to the FROM 28.

When the set correction amount of the target servo sector was not changed in the past (S101: No), the controller 30 sets a WOS for the target servo sector (S102). Here, the controller 30 sets a non-tightened WOS.

When the magnetic head 22 passes through the target servo sector, the controller 30 subsequently determines whether or not a read error of a post code has occurred in the target servo sector (S103).

For example, the controller 30 executes error correction on the read post code. When the error correction is successful, the controller 30 determines that no read error has occurred. When the error correction fails, the controller 30 determines that a read error has occurred. A method of determining whether or not a read error of the post code has occurred is not limited thereto.

When a read error of the post code occurs (S103: Yes), the controller 30 determines whether or not the error has continuously occurred in the target servo sector (S104). That is, the controller 30 determines whether or not write retry has been performed once or more in the target servo sector.

When an error has not continuously occurred in the target servo sector (S104: Nos), that is, when the read error that has occurred is a first error, the controller 30 waits for one rotation of the magnetic disk 11 (S105). The controller 30 reads the servo information SV including the post code from the target servo sector again, and repeats the series of processing from S103 again. That is, the controller 30 performs write retry.

When an error continuously occurs in the target servo sector (S104: Yes), the controller 30 executes processing of changing the set correction amount (S106). The controller 30 tightens the WOS (S107). The controller 30 executes the series of processing from S105.

When the read error of the post code does not occur (S103: No), the controller 30 stores the current set correction amount and the current WOS of the target servo sector at a predetermined position (e.g., FROM 28) (S108).

When determining, in the determination processing of S101, that the set correction amount of the target servo sector was changed in the past (S101: Yes), the controller 30 loads the set correction amount and the WOS stored by processing of S108 executed in the past (S109), and uses the set correction amount and the WOS in the subsequent processing.

After the processing of S108 or S109, the controller 30 compares the positional error signal with the WOS to determine whether or not the position of the magnetic head 22 is within the write permitted range (S110). That is, the controller 30 determines whether or not the magnetic head 22 is in the on-track state.

When the position of the magnetic head 22 is not within the write permitted range (S110: No), the controller 30 determines whether or not the set correction amount of the target servo sector was not changed in the past and an error has continuously occurred in the target servo sector (S111).

When the set correction amount of the target servo sector was changed in the past or the error that has occurred is the first error (S111: No), the controller 30 executes the series of processing from S105.

When the set correction amount of the target servo sector was not changed in the past and an error continuously occurs in the target servo sector (S111: Yes), the controller 30 executes processing of changing the set correction amount (S112). The controller 30 tightens the WOS (S113). The controller 30 executes the series of processing from S105.

When the position of the magnetic head 22 is within the write permitted range (S110: Yes), the controller 30 writes data to a data sector of a write destination (S114). The write operation ends.

Figure 8:
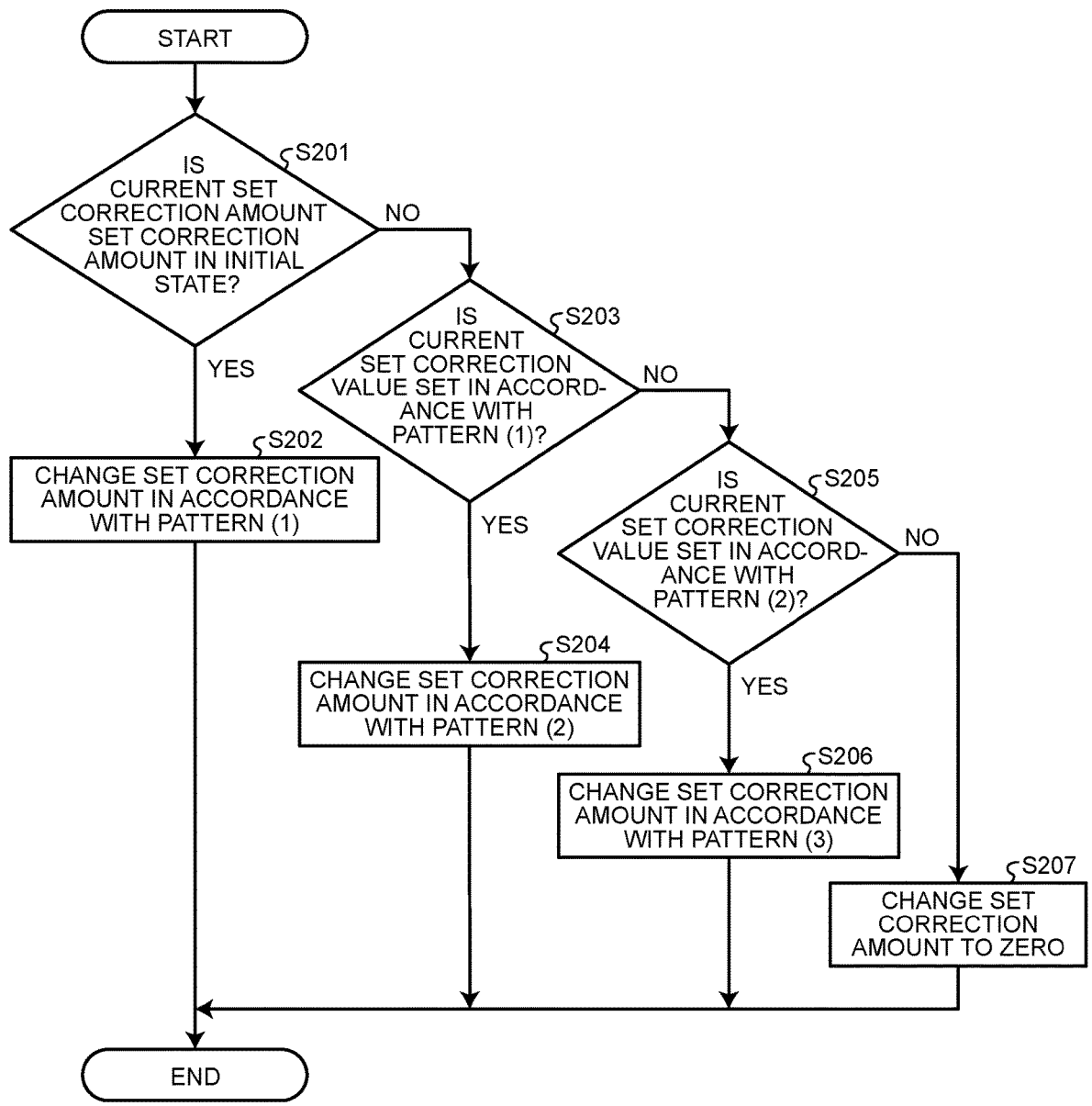
FIG. 8 is a flowchart illustrating one example of operation of changing a set correction amount according to the first embodiment.

FIG. 8 is a flowchart illustrating one example of operation of changing a set correction amount according to the first embodiment. A series of operations in FIG. 8 is executed in each piece of processing of S106 and S112 in FIG. 7.

First, the controller 30 determines whether or not the current set correction amount is the set correction amount in the initial state (S201). When the current set correction amount is the set correction amount in the initial state (S201: Yes), the controller 30 changes the set correction amount in accordance with the pattern (1) (S202). That is, the controller 30 sets an interpolation value between an RRO correction value indicated by a post code of a servo sector SCT adjacent before a target servo sector and an RRO correction value indicated by a post code of a servo sector SCT adjacent after the target servo sector as a new set correction amount.

When the current set correction amount is not the set correction amount in the initial state (S201: No), the controller 30 determines whether or not the current set correction amount is set in accordance with the pattern (1) (S203). When the current set correction amount is set in accordance with the pattern (1) (S203: Yes), the controller 30 changes the set correction amount in accordance with the pattern (2) (S204). That is, the controller 30 sets the RRO correction value indicated by the post code of the servo sector SCT adjacent before the target servo sector as a new set correction amount.

When the current set correction amount is not set in accordance with the pattern (1) (S203: No), the controller 30 determines whether or not the current set correction amount is set in accordance with the pattern (2) (S205). When the current set correction amount is set in accordance with the pattern (2) (S205: Yes), the controller 30 changes the set correction amount in accordance with the pattern (3) (S206). That is, the controller 30 sets the RRO correction value indicated by the post code of the servo sector SCT adjacent after the target servo sector as a new set correction amount.

When the current set correction amount is not set in accordance with the pattern (2) (S205: No), that is, when the current set correction amount is set in accordance with the pattern (3), the controller 30 sets the set correction amount to zero (S207). That is, the RRO correction is set not to be performed.

After S202, S204, S206, or S207, the operation of changing the set correction amount ends.

In this way, in one example, each time an error occurs in the same servo sector SCT, the patterns (1) to (3) are applied in order to execute write retry.

As described above, according to the first embodiment, when a read error of a post code continuously occurs in one servo sector SCT, the controller 30 uses another RRO correction value different from the RRO correction value indicated by the post code.

Since not an RRO correction value indicated by the post code in which a read error has occurred but another RRO correction value is used, the possibility of occurrence of off-track can be inhibited as compared with that in a case where the RRO correction value indicated by the post code in which the read error has occurred is used. This can inhibit the number of repetitions of retry write, and performance is improved.

According to the first embodiment, the controller 30 uses an interpolation value between RRO correction values indicated by post codes of two adjacent servo sectors SCT instead of the RRO correction value indicated by the post code in which the read error has occurred.

Since the controller 30 acquires a new RRO correction value based on another post code read from a position close to a position where the post code in which the read error has occurred is recorded, the possibility of occurrence of off-track can be inhibited.

A similar effect can be obtained even when the controller 30 uses an RRO correction value indicated by a post code of one of two adjacent servo sectors SCT instead of the RRO correction value indicated by the post code in which the read error has occurred.

According to the first embodiment, the used set correction amount is stored. When write is executed in the servo sector SCT next time, the already stored set correction amount is used.

This can inhibit the occurrence of write retry each time new write is executed to the same servo sector SCT. That is, the occurrence frequency of write retry can be further inhibited, and performance is improved.

According to the first embodiment, the controller 30 sets the write permitted range at the time of write. When a read error of the post code continuously occurs, the controller 30 changes the set correction amount, and reduces the width of the write permitted range.

This can inhibit a risk that data of an adjacent track is erroneously overwritten with new data.

According to the first embodiment, the reduced width of the write permitted range is store together when the used set correction amount is stored. When write is executed in the servo sector SCT next, the set correction amount and the reduced width that have already been stored are used.

This can inhibit a risk that data of an adjacent track is erroneously overwritten with new data.

Second Embodiment

A method called shingled magnetic recording (SMR) and a method called conventional magnetic recording (CMR) are known as methods of writing data to a magnetic disk.

In the SMR method, when data (referred to as first data) of a certain track is written and then data (referred to as second data) of a track radially adjacent to the track is written, tracks are arranged such that the second data overlaps a part of the first data. That is, according to the SMR method, data of one of two tracks adjacent to each other in the radial direction of the magnetic disk 11 is written so as to overlap a part of data of the other of the two tracks. This makes a track pitch narrower than the width of a write head, and recording density is improved.

In contrast, according to the CMR method, each track is arranged so as not to overlap a track adjacent in the radial direction.

In recent years, there has been developed a magnetic disk device that can switch a method of writing data to a magnetic disk between the CMR method and the SMR method. In such a magnetic disk device, a track can be set at any position in the radial direction of the magnetic disk. That is, the magnetic disk device is configured such that the RRO correction can be performed regardless of where the track is set in the radial direction of the magnetic disk.

In a second embodiment, a magnetic disk device that can perform RRO correction regardless of where a track is set in the radial direction of a magnetic disk will be described. Here, matters different from those in the first embodiment will be described. The same matters as those of the first embodiment will not be described or will be briefly described.

Figure 9:
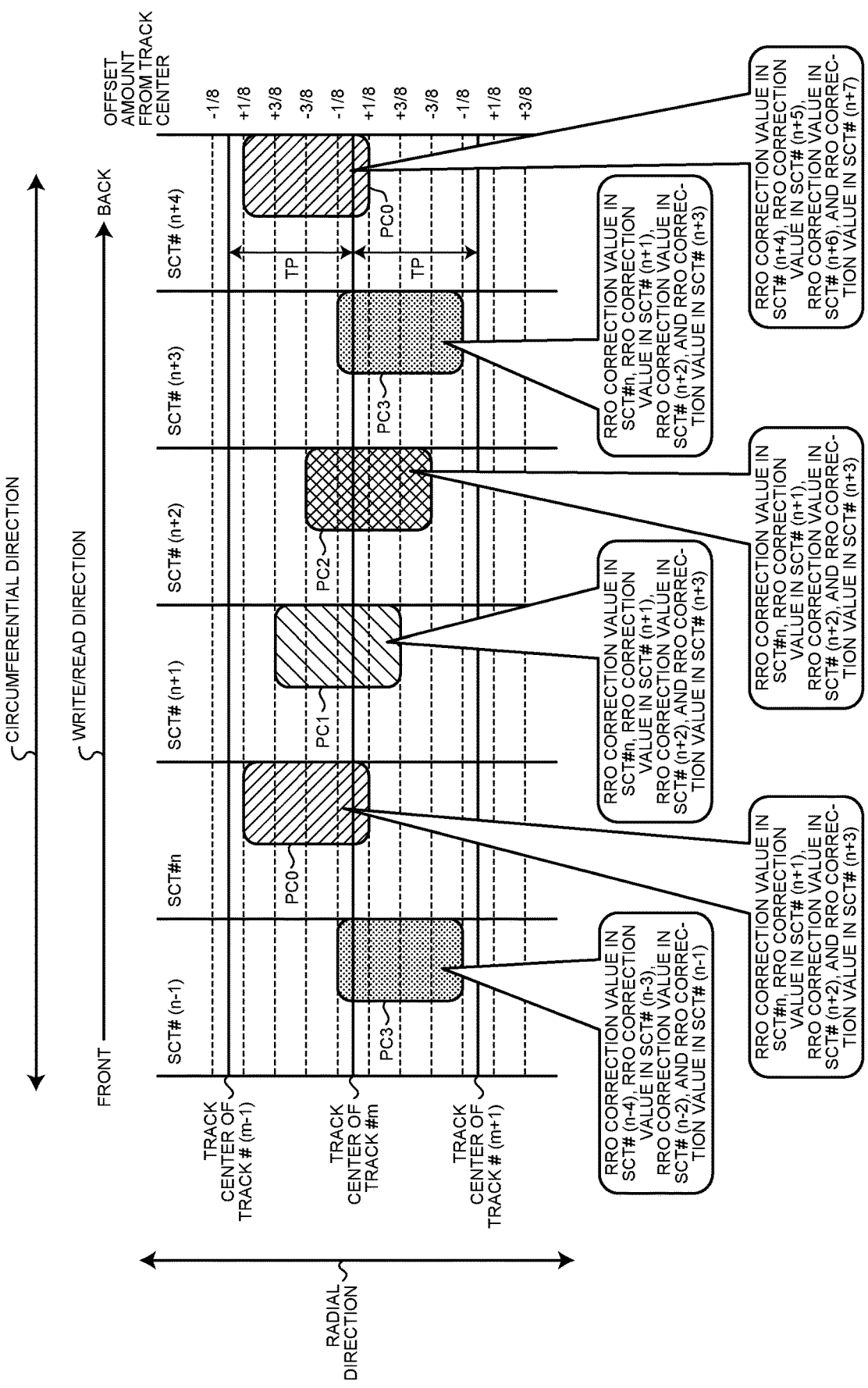
FIG. 9 is a schematic diagram for illustrating a write position of a post code according to a second embodiment.

FIG. 9 is a schematic diagram for illustrating a write position of a post code according to the second embodiment. The figure illustrates, in the radial direction, the positions of a track center of a track #m and track centers of two tracks #(m−1) and #(m+1) adjacent to the track #m. In the circumferential direction, continuously arranged servo sectors SCT #(n−1) to #(n+4) are illustrated.

The tracks #(m−1) to #(m+1) are defined based on the servo information SV. A track defined based on the servo information SV is referred to as a servo track. Data is written along a track for data write (referred to as data track) set separately from the servo track. The data track is set in accordance with a method such as the CMR method and the SMR method.

Post codes are written in a plurality of continuous servo sectors SCT while being shifted little by little in the radial direction. Here, in one example, post codes of four continuous servo sectors SCT are written while being shifted by ¼ pitch in the radial direction based on the track pitch of the servo track.

More specifically, a post code PC0 of the servo sector SCT #n is written to have a predetermined width centered on a position ⅜ pitch away from a track center in a negative direction. A post code PC1 of the servo sector SCT #(n+1) is written to have a predetermined width centered on a position ⅛ pitch away from the track center in the negative direction. A post code PC2 of the servo sector SCT #(n+2) is written to have a predetermined width centered on a position ⅛ pitch away from the track center in a positive direction. A post code PC3 of the servo sector SCT #(n+3) is written to have a predetermined width centered on a position ⅜ pitch away from the track center in the positive direction.

The post code PC0 includes RRO correction values at positions of the servo sectors SCT #n to SCT #(n+3) on the radial position ⅜ pitch away from the track center in the negative direction. The post code PC1 includes RRO correction values at positions of the servo sectors SCT #n to SCT #(n+3) on the radial position ⅛ pitch away from the track center in the negative direction. The post code PC2 includes RRO correction values at positions of the servo sectors SCT #n to SCT #(n+3) on the radial position ⅛ pitch away from the track center in the positive direction. The post code PC3 includes RRO correction values at positions of the servo sectors SCT #n to SCT #(n+3) on the radial position ⅜ pitch away from the track center in the positive direction.

When a certain data track (referred to as target data track) is set, the controller 30 executes RRO correction by using two PCs arranged in the radial direction corresponding to the radial position of the target data track from the PC0 to PC3.

For example, when the target data track is set between a radial position ⅜ pitch away from the track center (more accurately, center of servo track) in the negative direction and a radial position ⅛ pitch away from the track center in the negative direction, the controller 30 uses the PC0 and PC1. The controller 30 uses an interpolated value based on the RRO correction values of the servo sectors SCT read from the PC0 and the RRO correction values of the servo sectors SCT read from the PC1 for RRO correction in each servo sector.

When the target data track is set between a radial position ⅛ pitch away from the track center in the negative direction and a radial position ⅛ pitch away from the track center in the positive direction, the controller 30 uses the PC1 and PC2. The controller 30 uses an interpolated value based on the RRO correction values of the servo sectors SCT read from the PC1 and the RRO correction values of the servo sectors SCT read from the PC2 for RRO correction in each servo sector.

When the target data track is set between a radial position ⅛ pitch away from the track center in the positive direction and a radial position ⅜ pitch away from the track center in the positive direction, the controller 30 uses the PC2 and PC3. The controller 30 uses an interpolated value based on the RRO correction values of the servo sectors SCT read from the PC2 and the RRO correction values of the servo sectors SCT read from the PC3 for RRO correction in each servo sector.

In this way, in initial setting, a value calculated based on a pair in accordance with the radial position of the target data track among pairs of a post code PCi (where i is 0, 1, or 2.) and a post code PC(i+1), which are selected from the post codes PC0 to PC3 is set to be used as an RRO correction value.

In the second embodiment, the controller 30 executes operation of changing a set correction amount, that is, recombination of a pair to be used in S106 and S112 in FIG. 7.

Figure 10:
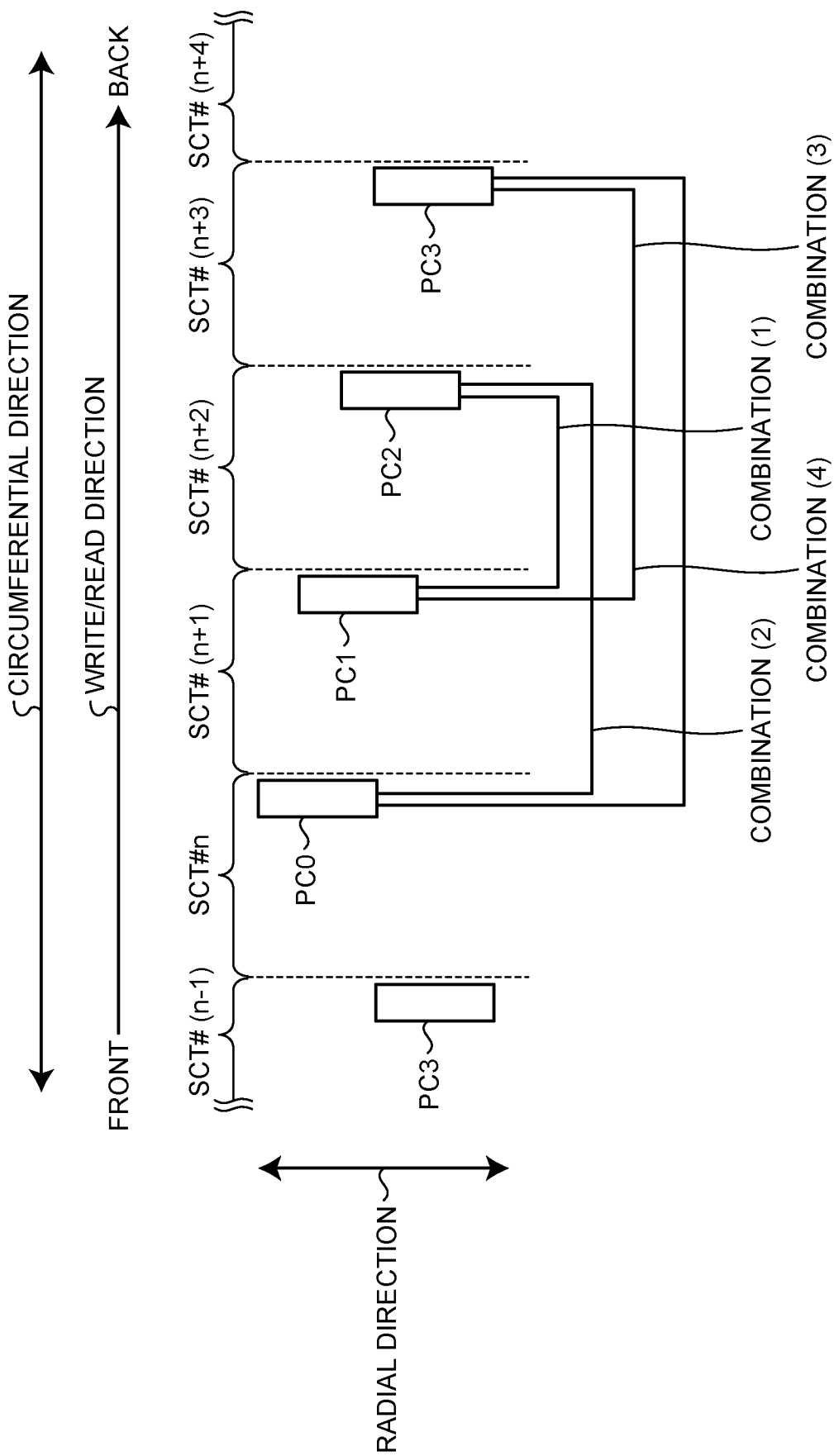
FIG. 10 illustrates one example of a method of changing a set correction amount according to the second embodiment.

FIG. 10 illustrates one example of a method of changing a set correction amount according to the second embodiment.

For example, when a pair of PC0 and PC1 is set to be used in the initial setting and a read error occurs in PC0, an RRO correction value calculated based on a pair of PC1 and PC2 can be used instead of an RRO correction value calculated based on the pair of PC0 and PC1. When a pair of PC2 and PC3 is set to be used in the initial setting and a read error occurs in PC3, the RRO correction value calculated based on a pair of PC1 and PC2 can be used instead of an RRO correction value calculated based on the pair of PC2 and PC3. The pair of PC1 and PC2 is referred to as a combination (1).

When the pair of PC0 and PC1 is set to be used in the initial setting and a read error occurs in PC1, an RRO correction value calculated based on a pair of PC0 and PC2 can be used instead of the RRO correction value calculated based on the pair of PC0 and PC1. When the pair of PC1 and PC2 is set to be used in the initial setting and a read error occurs in PC1, the RRO correction value calculated based on the pair of PC0 and PC2 can be used instead of the RRO correction value calculated based on the pair of PC1 and PC2. The pair of PC0 and PC2 is referred to as a combination (2).

When the pair of PC1 and PC2 is set to be used in the initial setting and a read error occurs in PC2, an RRO correction value calculated based on a pair of PC1 and PC3 can be used instead of the RRO correction value calculated based on the pair of PC1 and PC2. When the pair of PC2 and PC3 is set to be used in the initial setting and a read error occurs in PC2, the RRO correction value calculated based on the pair of PC1 and PC3 can be used instead of the RRO correction value calculated based on the pair of PC2 and PC3. The pair of PC1 and PC3 is referred to as a combination (3).

When the pair of PC0 and PC1 is set to be used in the initial setting and a read error occurs in PC1, an RRO correction value calculated based on a pair of PC0 and PC3 can be used instead of the RRO correction value calculated based on the pair of PC0 and PC1. When the pair of PC1 and PC2 is set to be used in the initial setting and a read error occurs in PC1 or PC2, the RRO correction value calculated based on the pair of PC0 and PC3 can be used instead of the RRO correction value calculated based on the pair of PC1 and PC2. When the pair of PC2 and PC3 is set to be used in the initial setting and a read error occurs in PC2, the RRO correction value calculated based on the pair of PC0 and PC3 can be used instead of the RRO correction value calculated based on the pair of PC2 and PC3. The pair of PC0 and PC3 is referred to as a combination (4).

Figure 11:
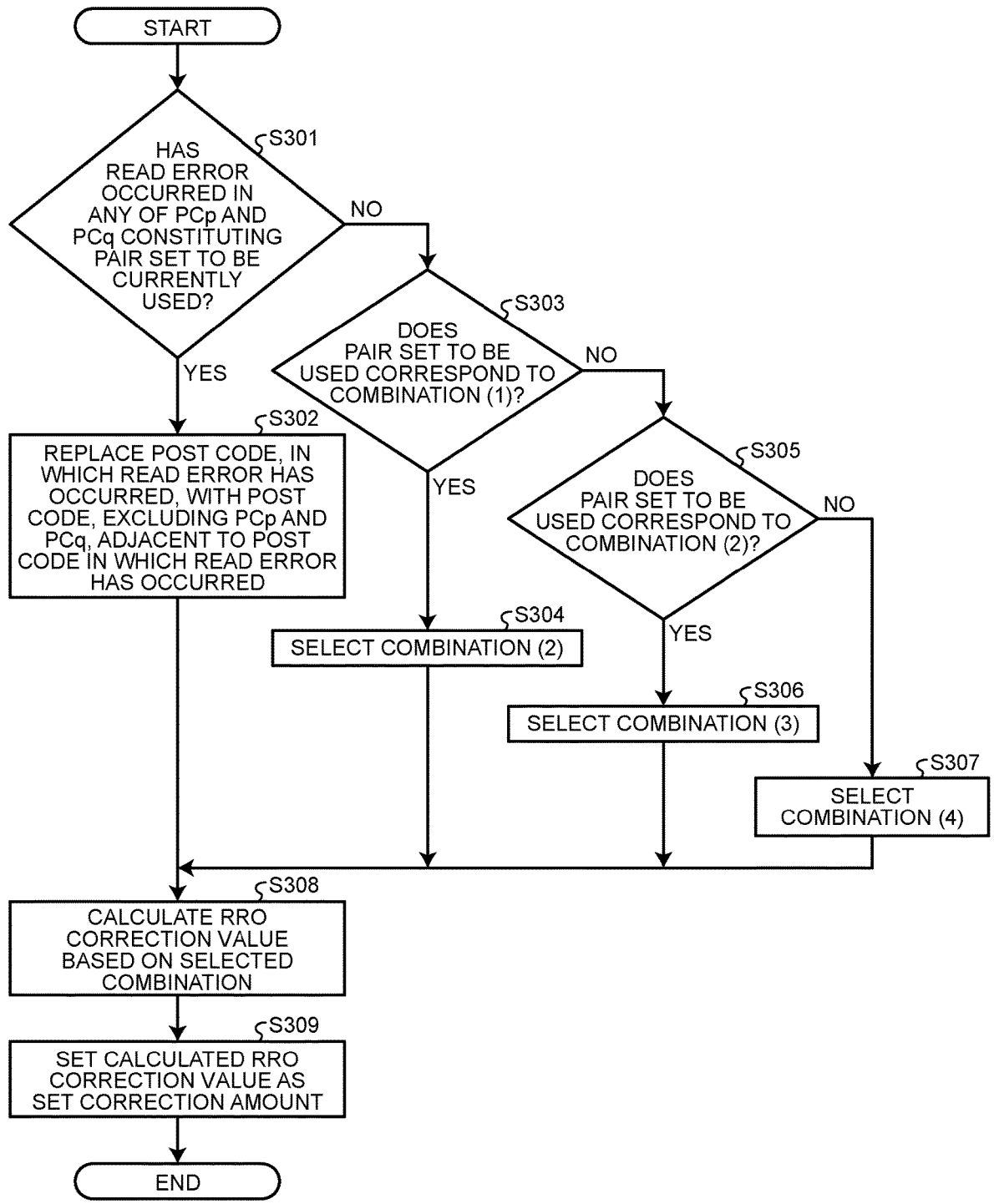
FIG. 11 is a flowchart illustrating one example of operation of changing the set correction amount according to the second embodiment.

FIG. 11 is a flowchart illustrating one example of the operation of changing a set correction amount according to the second embodiment. A series of operations in FIG. 11 is executed in each piece of processing of S106 and S112 in FIG. 7.

First, the controller 30 determines whether or not a read error has occurred in any of PCp and PCq constituting a pair set to be currently used (S301). Here, p and q are integers from 0 to 3.

When a read error occurs in any of PCp and PCq (S301: Yes), the controller 30 replaces the post code, in which the read error has occurred, among PCp and PCq with a post code, excluding PCp and PCq, adjacent to the post code in which the read error has occurred (S302).

When a read error has not occurred in any of PCp and PCq (S301: No), the controller 30 determines whether or not the pair set to be used corresponds to the combination (1) (S303).

When the pair set to be used corresponds to the combination (1) (S303: Yes), the controller 30 selects the combination (2) (S304).

When the pair set to be used does not correspond to the combination (1) (S303: No), the controller 30 determines whether or not the pair set to be used corresponds to the combination (2) (S305).

When the pair set to be used corresponds to the combination (2) (S305: Yes), the controller 30 selects the combination (3) (S306). When the pair set to be used does not correspond to the combination (2) (S305: No), the controller 30 selects the combination (4) (S307).

After the processing of S302, S304, S306, or S307, the controller 30 calculates an RRO correction value based on the selected combination (S308).

The controller 30 sets the calculated RRO correction value as a set correction amount (S309). The operation of changing a set correction amount ends.

In this way, when post codes are written at different positions in the radial direction in a plurality of continuously arranged servo sectors SCT, the controller 30 executes positioning of the magnetic head 22 based on a pair of post codes in accordance with the radial position of a data track among a group of post codes of the plurality of continuously arranged servo sectors SCT. When a read error of a certain post code continuously occurs, the controller 30 can use a pair not including the post code for positioning control instead of a pair including the post code.

The possibility of occurrence of off-track can be inhibited as compared with that in a case where the RRO correction value indicated by the post code in which the read error has occurred is used. This can inhibit the number of repetitions of retry write, and performance is improved.

As described in the first and second embodiments, when a read error of a post code continuously occurs in a certain servo sector, the controller 30 uses a correction amount different from a correction amount set based on the RRO correction value indicated by the post code.

This improves the performance of the magnetic disk device 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk in which a plurality of servo sectors is arranged in a circumferential direction and servo information including a post code indicating a repeatable runout (RRO) correction amount is written in each of the plurality of servo sectors;
a magnetic head that writes and reads data to and from the magnetic disk; and
a controller that, when a read error of a first post code continuously occurs in positioning control of the magnetic head, the first post code being a post code of a first servo sector which is one of the plurality of servo sectors, uses a first RRO correction value different from a second RRO correction value, the second RRO correction value being set based on an RRO correction value indicated by the first post code,
wherein the first RRO correction value is an interpolation value between RRO correction values indicated by post codes of two second servo sectors adjacent to the first servo sector among the plurality of servo sectors.

2. A magnetic disk device comprising:
a magnetic disk in which a plurality of servo sectors are arranged in a circumferential direction and servo information including a post code indicating a repeatable runout (RRO) correction amount is written in each of the plurality of servo sectors;
a magnetic head that writes and reads data to and from the magnetic disk; and
a controller that, when read error of a first post code continuously occurs in positioning control of the magnetic head, the first post code being a post code of a first servo sector which is one of the plurality of servo sectors, uses a first RRO correction value different from a second RRO correction value, the second RRO correction value being set based on an RRO correction value indicated by the first post code,
wherein the first RRO correction value is an RRO correction value indicated by a post code of a second servo sector adjacent to the first servo sector among the plurality of servo sectors.

3. A magnetic disk device comprising:
a magnetic disk in which a plurality of servo sectors is arranged in a circumferential direction and servo information including a post code indicating a repeatable runout (RRO) correction amount is written in each of the plurality of servo sectors;
a magnetic head that writes and reads data to and from the magnetic disk; and
a controller that, when a read error of a first post code continuously occurs in positioning control of the magnetic head, the first post code being a post code of a first servo sector which is one of the plurality of servo sectors, uses a first RRO correction value different from a second RRO correction value, the second RRO correction value being set based on an RRO correction value indicated by the first post code,
wherein a post code is written at different positions in a radial direction in each of the plurality of servo sectors, a track is set in the magnetic disk, and the controller:
executes positioning of the magnetic head based on two RRO correction values indicated by a pair of post codes in accordance with a position of the track in a radial direction among a group of post codes of the plurality of servo sectors; and
when a read error of the first post code continuously occurs, uses, for the positioning, a second pair not including the first post code instead of a first pair including the first post code.

4. A magnetic disk device comprising:
a magnetic disk in which a plurality of servo sectors is arranged in a circumferential direction and servo information including a post code indicating a repeatable runout (RRO) correction amount is written in each of the plurality of servo sectors;
a magnetic head that writes and reads data to and from the magnetic disk; and
a controller that, when a read error of a first post code continuously occurs in positioning control of the magnetic head, the first post code being a post code of a first servo sector which is one of the plurality of servo sectors, uses a first RRO correction value different from a second RRO correction value, the second RRO correction value being set based on an RRO correction value indicated by the first post code,
wherein the controller:
sets a write permitted range having a width of a first value in a radial direction at a time of write; and
when a read error of the first post code continuously occurs, sets a width of the write permitted range to a second value smaller than the first value in the first servo sector.

5. The magnetic disk device according to claim 2, wherein the controller:
sets a write permitted range having a width of a first value in a radial direction at a time of write; and
when a read error of the first post code continuously occurs, sets a width of the write permitted range to a second value smaller than the first value in the first servo sector.

6. The magnetic disk device according to claim 2, wherein the controller:
sets a write permitted range having a width of a first value in a radial direction at a time of write; and
when a read error of the first post code continuously occurs, sets a width of the write permitted range to a second value smaller than the first value in the first servo sector.

7. The magnetic disk device according to claim 3, wherein the controller:
sets a write permitted range having a width of a first value in a radial direction at a time of write; and
when a read error of the first post code continuously occurs, sets a width of the write permitted range to a second value smaller than the first value in the first servo sector.

8. The magnetic disk device according to claim 3, further comprising a memory,
wherein the controller:
stores the first RRO correction value in the memory after using the first RRO correction value; and
uses the first RRO correction value stored in the memory.

9. The magnetic disk device according to claim 4, further comprising a memory,
wherein the controller:
stores the first RRO correction value and the second value in the memory after using the first RRO correction value and the second value; and
uses the first RRO correction value and the second value stored in the memory.

10. A method of controlling a magnetic disk device including:
a magnetic disk in which a plurality of servo sectors is arranged in a circumferential direction and servo information including a post code indicating an RRO correction value is written in each of the plurality of servo sectors; and a magnetic head that writes and reads data to and from the magnetic disk, the method comprising:
using, when a read error of a first post code continuously occurs in positioning control of the magnetic head, the first post code being a post code of a first servo sector which is one of the plurality of servo sectors, a first RRO correction value different from a second RRO correction value, the second RRO correction value being set based on an RRO correction value indicated by the first post code,
wherein the first RRO correction value is an interpolation value between RRO correction values indicated by post codes of two second servo sectors adjacent to the first servo sector among the plurality of servo sectors.

11. A method of controlling a magnetic disk device including:
a magnetic disk in which a plurality of servo sectors is arranged in a circumferential direction and servo information including a post code indicating an RRO correction value is written in each of the plurality of servo sectors; and a magnetic head that writes and reads data to and from the magnetic disk, the method comprising:
using, when a read error of a first post code continuously occurs in positioning control of the magnetic head, the first post code being a post code of a first servo sector which is one of the plurality of servo sectors, a first RRO correction value different from a second RRO correction value, the second RRO correction value being set based on an RRO correction value indicated by the first post code,
wherein the first RRO correction value is an RRO correction value indicated by a post code of a second servo sector adjacent to the first servo sector among the plurality of servo sectors.

12. A method of controlling a magnetic disk device including:
a magnetic disk in which a plurality of servo sectors is arranged in a circumferential direction and servo information including a post code indicating an RRO correction value is written in each of the plurality of servo sectors; and a magnetic head that writes and reads data to and from the magnetic disk, the method comprising:
using, when a read error of a first post code continuously occurs in positioning control of the magnetic head, the first post code being a post code of a first servo sector which is one of the plurality of servo sectors, a first RRO correction value different from a second RRO correction value, the second RRO correction value being set based on an RRO correction value indicated by the first post code,
wherein a post code is written at different positions in a radial direction in each of the plurality of servo sectors,
a track is set in the magnetic disk,
the method further comprising:
executing positioning of the magnetic head based on two RRO correction values indicated by a pair of post codes in accordance with a position of the track in a radial direction among a group of post codes of the plurality of servo sectors; and
when a read error of the first post code continuously occurs, using, for the positioning, a second pair not including the first post code instead of a first pair including the first post code.

13. A method of controlling a magnetic disk device including:
a magnetic disk in which a plurality of servo sectors is arranged in a circumferential direction and servo information including a post code indicating an RRO correction value is written in each of the plurality of servo sectors; and a magnetic head that writes and reads data to and from the magnetic disk, the method comprising:
using, when a read error of a first post code continuously occurs in positioning control of the magnetic head, the first post code being a post code of a first servo sector which is one of the plurality of servo sectors, a first RRO correction value different from a second RRO correction value, the second RRO correction value being set based on an RRO correction value indicated by the first post code,
the method further comprising:
setting a write permitted range having a width of a first value in a radial direction at a time of write; and
when a read error of the first post code continuously occurs, setting a width of the write permitted range to a second value smaller than the first value in the first servo sector.

14. The method according to claim 10, further comprising:
setting a write permitted range having a width of a first value in a radial direction at a time of write; and
when a read error of the first post code continuously occurs, setting a width of the write permitted range to a second value smaller than the first value in the first servo sector.

15. The method according to claim 11, further comprising:
setting a write permitted range having a width of a first value in a radial direction at a time of write; and
when a read error of the first post code continuously occurs, setting a width of the write permitted range to a second value smaller than the first value in the first servo sector.

16. The method according to claim 12, further comprising:
setting a write permitted range having a width of a first value in a radial direction at a time of write; and
when a read error of the first post code continuously occurs, setting a width of the write permitted range to a second value smaller than the first value in the first servo sector.

17. The method according to claim 12, wherein the magnetic disk device further includes a memory,
the method comprising:
storing the first RRO correction value in the memory after using the first RRO correction value; and
using the first RRO correction value stored in the memory.

18. The method according to claim 13, wherein the magnetic disk device further includes a memory,
the method comprising:
  storing the first RRO correction value and the second value in the memory after using the first RRO correction value and the second value; and
  using the first RRO correction value and the second value stored in the memory.

* * * * *